United States Patent
Medles et al.

(10) Patent No.: US 11,528,676 B2
(45) Date of Patent: Dec. 13, 2022

(54) USER EQUIPMENT TIMING ADVANCE REPORTING IN NON-TERRESTRIAL NETWORK COMMUNICATIONS

(71) Applicant: MediaTek Singapore Pte. Ltd., Singapore (SG)

(72) Inventors: Abdelkader Medles, Cambridge (GB); Gilles Charbit, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 17/176,117

(22) Filed: Feb. 15, 2021

(65) Prior Publication Data
US 2021/0289460 A1    Sep. 16, 2021

Related U.S. Application Data

(60) Provisional application No. 62/987,372, filed on Mar. 10, 2020.

(51) Int. Cl.
| | |
|---|---|
| *H04W 56/00* | (2009.01) |
| *H04W 80/02* | (2009.01) |
| *H04W 72/12* | (2009.01) |
| *H04W 74/08* | (2009.01) |
| *H04W 76/27* | (2018.01) |
| *H04W 84/06* | (2009.01) |

(52) U.S. Cl.
CPC ..... *H04W 56/005* (2013.01); *H04W 72/1268* (2013.01); *H04W 72/1284* (2013.01); *H04W 74/0833* (2013.01); *H04W 76/27* (2018.02); *H04W 80/02* (2013.01); *H04W 84/06* (2013.01)

(58) Field of Classification Search
None
See application file for complete search history.

(56) References Cited

U.S. PATENT DOCUMENTS

| | | | | |
|---|---|---|---|---|
| 2019/0342845 | A1* | 11/2019 | Laselva | H04L 1/1812 |
| 2021/0105761 | A1* | 4/2021 | Cheng | H04L 5/0044 |
| 2021/0251012 | A1* | 8/2021 | Shrestha | H04W 72/042 |
| 2021/0297149 | A1* | 9/2021 | Hsieh | H04B 7/01 |
| 2022/0086780 | A1* | 3/2022 | Tsai | H04W 56/006 |

OTHER PUBLICATIONS

R1-1909782 ZTE "Summary#3 of 7.2.5.3 on UL timing and PRACH for NTN" 3GPP WG1 #98 (Year: 2019).*

* cited by examiner

*Primary Examiner* — Basil Ma
(74) *Attorney, Agent, or Firm* — Han IP PLLC; Andy M. Han (57) ABSTRACT

Various solutions for timing advance (TA) reporting by a user equipment (UE) in non-terrestrial network (NTN) communications are described. An apparatus (e.g., a UE), capable of auto-compensation of time delays in signaling, establishes a wireless connection with a network node of a wireless network. The apparatus then transmits a TA report to the network node. Based on the TA, the network can configure a UE-specific offset for UL scheduling.

8 Claims, 4 Drawing Sheets

USER EQUIPMENT TIMING ADVANCE REPORTING IN NON-TERRESTRIAL NETWORK COMMUNICATIONS

CROSS REFERENCE TO RELATED PATENT APPLICATION(S)

The present disclosure is part of a non-provisional application claiming the priority benefit of U.S. Patent Application No. 62/987,372, filed on 10 Mar. 2020, the content of which being incorporated by reference in its entirety.

TECHNICAL FIELD

The present disclosure is generally related to mobile communications and, more particularly, to user equipment (UE) timing advancement (TA) reporting in non-terrestrial network (NTN) communications.

BACKGROUND

Unless otherwise indicated herein, approaches described in this section are not prior art to the claims listed below and are not admitted as prior art by inclusion in this section.

In wireless communications such as mobile communications under 3$^{rd}$ Generation Partnership Project (3GPP) specifications, timing advance corresponds to the duration of time it takes a signal to reach a base station (e.g., gNB) from a UE. To avoid misalignment in timing, from time to time the base station would issue TA commands to the UE to enable the UE to adjust its uplink (UL) transmissions. In NTN systems in which a non-terrestrial network node, such as a satellite, is hundreds of kilometers above the surface of the Earth, timing advance can be very large.

For UEs with auto-compensation capability of the delay spread with the assistance of Global Navigation Satellite System (GNSS) or other means, the base station would not be aware of the TA. For frequency division duplexing (FDD)-half-duplex systems and time division duplexing (TDD), downlink (DL) and UL scheduling by the base station could collide on the UE's side unless the base station is aware of the TA used by the UE. Thus, when an UL transmission is scheduled, the window of time covered by the differential roundtrip time (RTT) within a beam coverage of the satellite cannot be used for DL scheduling. Therefore, there is a need for a solution that enables the UE to report its TA to the base station in NTN communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues. More specifically, various schemes proposed in the present disclosure pertain to TA reporting by UE in NTN communications.

In one aspect, a method may involve an apparatus, which is capable of auto-compensation of time delays in signaling, establishing a wireless connection with a network node of a wireless network. The method may also involve the apparatus transmitting a TA report to the network node.

In another aspect, a method may involve an apparatus, which is capable of auto-compensation of time delays in signaling, receiving, from a network node of a wireless network an apparatus-specific configuration of an offset value, an apparatus-specific configuration of an offset value. The method may also involve the apparatus performing, by the processor, UL scheduling or UL transmission with the offset value applied.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT), Narrow Band Internet of Things (NB-IoT), Industrial Internet of Things (IIoT) and non-terrestrial network (NTN), the proposed concepts, schemes and any variation(s)/derivative (s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to TA reporting by UE in NTN communications. According to the present disclosure, a number of possible solutions may be implemented separately or jointly. That is, although these possible solutions may be described below separately, two or more of these possible solutions may be implemented in one combination or another.

Figure 1:
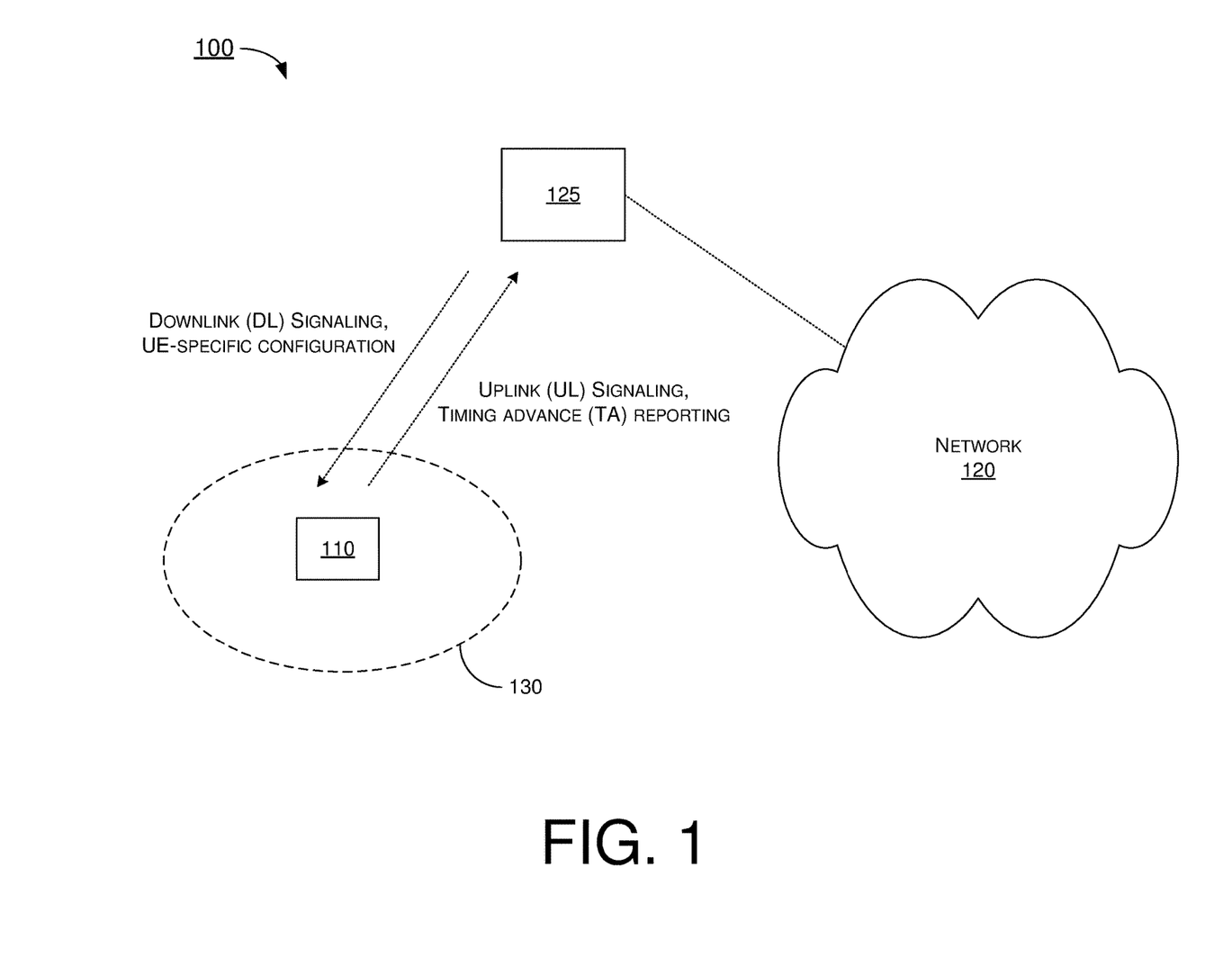
FIG. 1 is a diagram of an example network environment in which various proposed schemes in accordance with the present disclosure may be implemented.

FIG. 1 illustrates an example network environment 100 in which various proposed schemes in accordance with the present disclosure may be implemented. Network environment 100 may involve a UE 110 and a wireless network 120 (e.g., an LTE network, a 5G network, an NR network, an IoT network, an NB-IoT network, an IIoT network or an NTN network). UE 110 may communicate with wireless network 120 via a network node 125. In some cases, network node 125 may be a non-terrestrial (NT) network node (e.g., a satellite) of an NTN. In some cases, network node 125 may be a terrestrial network node (e.g., a base station (BS) such as a gNB, eNB or transmission/reception point (TRP)). Each of UE 110 and network node 125 may be configured to perform operations pertaining to TA reporting by UE 110 under various proposed schemes in accordance with the present disclosure, as described below.

Under a proposed scheme in accordance with the present disclosure, to allow network node 125 to schedule UE 110 without collision between DL transmission(s) and UL transmission(s), UE 110, which is capable of auto-compensation of time delays in signaling, may report its TA to network node 125. For instance, UE 110 may provide a TA report to network node 125 by transmitting the TA report in a medium access control (MAC) control element (CE). Alternatively, or additionally, UE 110 may provide a TA report to network node 125 through UL control information (e.g., in physical uplink control channel (PUCCH) transmission). Alternatively, or additionally, UE 110 may provide a TA report to network node 125 through higher-layer signaling (e.g., via radio resource control (RRC) signaling).

Under a proposed scheme in accordance with the present disclosure, TA reporting may be transmitted as part of a random access channel (RACH) procedure. For instance, once UE 110 detects network 120 as an NTN and network node 125 as a satellite, UE 110 may transmit a TA report to network node 125 in a RACH procedure (e.g., in message 3 (Msg3), message 5 (Msg5) or message A (MsgA) in a 2-step or 4-step RACH procedure). Moreover, under the proposed scheme, UE 110 may be configured to transmits its TA report to network node 125 periodically. Alternatively, TA reporting by UE 110 may be trigger-based (e.g., based on a trigger signal from network node 125) or in accordance with a UE protocol. As an example, UE 110 may be configured to transmit a TA report to network node 125 in response to a value of TA deviating from a threshold by at least a predefined amount. As another example, UE 110 may be configured to transmit a TA report to network node 125 according to a timer (e.g., upon expiry of the timer which may be reset to start countdown again upon expiry).

Under a proposed scheme in accordance with the present disclosure, TA reports received by network node 125 from UE 110 may be used by network node 125 to configure an offset value ($K_{offset}$) specific to UE 110. The $K_{offset}$ may be utilized to extend K1 and/or K2. K1 is the offset between a DL slot where data is scheduled on a physical downlink shared channel (PDSCH) and an UL slot where an acknowledgment/negative acknowledgment (ACK/NACK) feedback for the scheduled PDSCH data is to be sent. K2 is the offset between a DL slot where a physical downlink control channel (PDCCH) (e.g., downlink control information (DCI)) for UL scheduling is received by UE 110 and an UL slot where UL data is to be sent on a physical uplink shared channel (PUSCH). Under the proposed scheme, network node 125 may configure the $K_{offset}$ specific to UE 110 based on TA report(s) received from UE 110 to extend value ranges of K1 and/or K2. Under the proposed scheme, upon configuring the UE-specific $K_{offset}$, network node 125 may transmit the $K_{offset}$ to UE 110 for UL scheduling and other procedures. Under the proposed scheme, the $K_{offset}$ may be initially based on a maximum RTT over a beam (e.g., cell 130) the coverage area of which UE 110 is located. Once UE 110 has established a wireless connection with network node 125, network node 125 may transmit the UE-specific $K_{offset}$, which may be configured based on a TA value indicated in the TA report(s), to UE 110.

Illustrative Implementations

Figure 2:
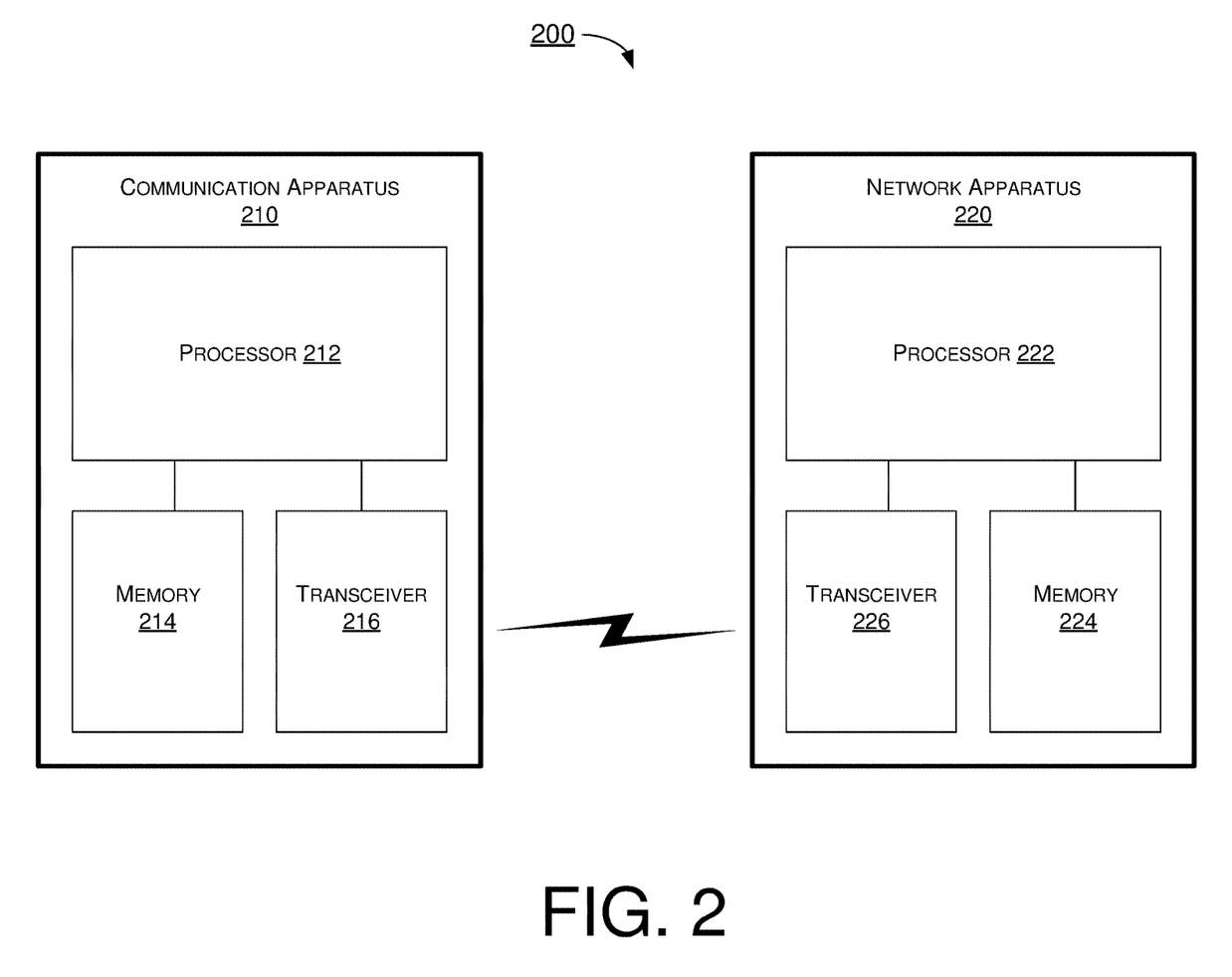
FIG. 2 is a block diagram of an example communication apparatus and an example network apparatus in accordance with an implementation of the present disclosure.

FIG. 2 illustrates an example communication apparatus 210 and an example network apparatus 220 in accordance with an implementation of the present disclosure. Each of communication apparatus 210 and network apparatus 220 may perform various functions to implement schemes, techniques, processes and methods described herein pertaining to TA reporting by UE in NTN communications, including scenarios/schemes described above as well as processes 500 and 600 described below.

Communication apparatus 210 may be a part of an electronic apparatus, which may be a UE such as a portable or mobile apparatus, a wearable apparatus, a wireless communication apparatus or a computing apparatus. For instance, communication apparatus 210 may be implemented in a smartphone, a smartwatch, a personal digital assistant, a digital camera, or a computing equipment such as a tablet computer, a laptop computer or a notebook computer. Communication apparatus 210 may also be a part of a machine type apparatus, which may be an IoT, NB-IoT, IIoT or NTN apparatus such as an immobile or a stationary apparatus, a home apparatus, a wire communication apparatus or a computing apparatus. For instance, communication apparatus 210 may be implemented in a smart thermostat, a smart fridge, a smart door lock, a wireless speaker or a home control center. Alternatively, communication apparatus 210 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 210 may include at least some of those components shown in FIG. 2 such as a processor 212, for example. Communication apparatus 210 may further include one or more other components not pertinent to the proposed scheme of the present disclosure (e.g., internal power supply, display device and/or user interface device), and, thus, such component(s) of communication apparatus 210 are neither shown in FIG. 2 nor described below in the interest of simplicity and brevity.

Network apparatus 220 may be a part of an electronic apparatus/station, which may be a network node such as a base station, a small cell, a router, a gateway or a satellite. For instance, network apparatus 220 may be implemented in an eNodeB in an LTE, in a gNB in a 5G, NR, IoT, NB-IoT, IIoT, or in a satellite in an NTN network. Alternatively, network apparatus 220 may be implemented in the form of one or more IC chips such as, for example and without limitation, one or more single-core processors, one or more multi-core processors, or one or more RISC or CISC processors. Network apparatus 220 may include at least some of those components shown in FIG. 2 such as a processor 222, for example. Network apparatus 220 may further include one or more other components not pertinent to the proposed scheme of the present disclosure (e.g., internal power supply, display device and/or user interface device), and, thus, such component(s) of network apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including power consumption reduction in a device (e.g., as represented by communication apparatus 210) and a network (e.g., as represented by network apparatus 220) in accordance with various implementations of the present disclosure.

In some implementations, communication apparatus 210 may also include a transceiver 216 coupled to processor 212 and capable of wirelessly transmitting and receiving data. In some implementations, communication apparatus 210 may further include a memory 214 coupled to processor 212 and capable of being accessed by processor 212 and storing data therein. In some implementations, network apparatus 220 may also include a transceiver 226 coupled to processor 222 and capable of wirelessly transmitting and receiving data. In some implementations, network apparatus 220 may further include a memory 224 coupled to processor 222 and capable of being accessed by processor 222 and storing data therein. Accordingly, communication apparatus 210 and network apparatus 220 may wirelessly communicate with each other via transceiver 216 and transceiver 226, respectively.

Each of communication apparatus 210 and network apparatus 220 may be a communication entity capable of communicating with each other using various proposed schemes in accordance with the present disclosure. To aid better understanding, the following description of the operations, functionalities and capabilities of each of communication apparatus 210 and network apparatus 220 is provided in the context of a mobile communication environment in which communication apparatus 210 is implemented in or as a communication apparatus or a UE (e.g., UE 110) and network apparatus 220 is implemented in or as a network node or base station (e.g., network node 125) of a communication network (e.g., network 120). It is also noteworthy that, although the example implementations described below are provided in the context of WLAN, the same may be implemented in other types of networks.

Under a proposed scheme pertaining to TA reporting by UE in NTN communications in accordance with the present disclosure, with communication apparatus 210 implemented in or as UE 110 and network apparatus 220 implemented in or as network node 125 in network environment 100, communication apparatus 210 may be capable of auto-compensation of time delays in signaling. Processor 212 may establish, via transceiver 216, a wireless connection with network apparatus 220 as a network node (e.g., base station 125) of a wireless network (e.g., network 120). Processor 212 may transmit, via transceiver 216, a TA report to network apparatus 220.

In some implementations, in transmitting the TA report, processor 212 may transmit the TA report in an MAC CE.

In some implementations, in transmitting the TA report, processor 212 may transmit the TA report in UL control information.

In some implementations, in transmitting the TA report, processor 212 may transmit the TA report via higher-layer signaling (e.g., RRC signaling).

In some implementations, in transmitting the TA report, processor 212 may transmit the TA report in a RACH procedure. In some implementations, in transmitting the TA report in the RACH procedure, processor 212 may transmit the TA report in a message 3 (Msg3), message 5 (Msg5) or message A (MsgA) in a 2-step or 4-step RACH procedure.

In some implementations, in transmitting the TA report, processor 212 may transmit the TA report responsive to determining that network apparatus 220 is a satellite of an NTN.

In some implementations, in transmitting the TA report, processor 212 may transmit the TA report periodically.

In some implementations, in transmitting the TA report, processor 212 may transmit the TA report responsive to receiving a trigger from network apparatus 220.

In some implementations, in transmitting the TA report, processor 212 may transmit the TA report responsive to a TA value deviating from a threshold by at least a predefined amount.

In some implementations, in transmitting the TA report, processor 212 may transmit the TA report responsive to expiry of a timer.

In some implementations, processor 212 may perform additional operations. For instance, processor 212 may receive, via transceiver 216, from network apparatus 220 an apparatus-specific configuration of an offset value ($K_{offset}$). Moreover, processor 212 may perform, via transceiver 216, UL scheduling or UL transmission with the offset value applied.

In some implementations, the offset value may be initially based on a maximum RTT over a beam. In such cases, network apparatus 220 may apply the apparatus-specific configuration of the offset value based on the received TA report.

Under a proposed scheme pertaining to TA reporting by UE in NTN communications in accordance with the present disclosure, with communication apparatus 210 implemented in or as UE 110 and network apparatus 220 implemented in or as network node 125 in network environment 100, communication apparatus 210 may be capable of auto-compensation of time delays in signaling. Processor 212 may receive, via transceiver 216, from network apparatus 220 as a network node (e.g., base station 125) of a wireless network (e.g., network 120) an apparatus-specific configuration of an offset value. That is, the offset value is specific to apparatus 210 and may be different for other UE(s) in wireless communication with the network. Additionally, processor 212 may perform, via transceiver 216, UL scheduling or UL transmission with the offset value applied.

In some implementations, the offset value may be initially based on a maximum RTT over a beam. Moreover, apparatus 220, as the network node, may apply the apparatus-specific configuration of the offset value based on a TA value indicated in a TA report after apparatus 220 receives the TA report from apparatus 210.

Illustrative Processes

Figure 3:
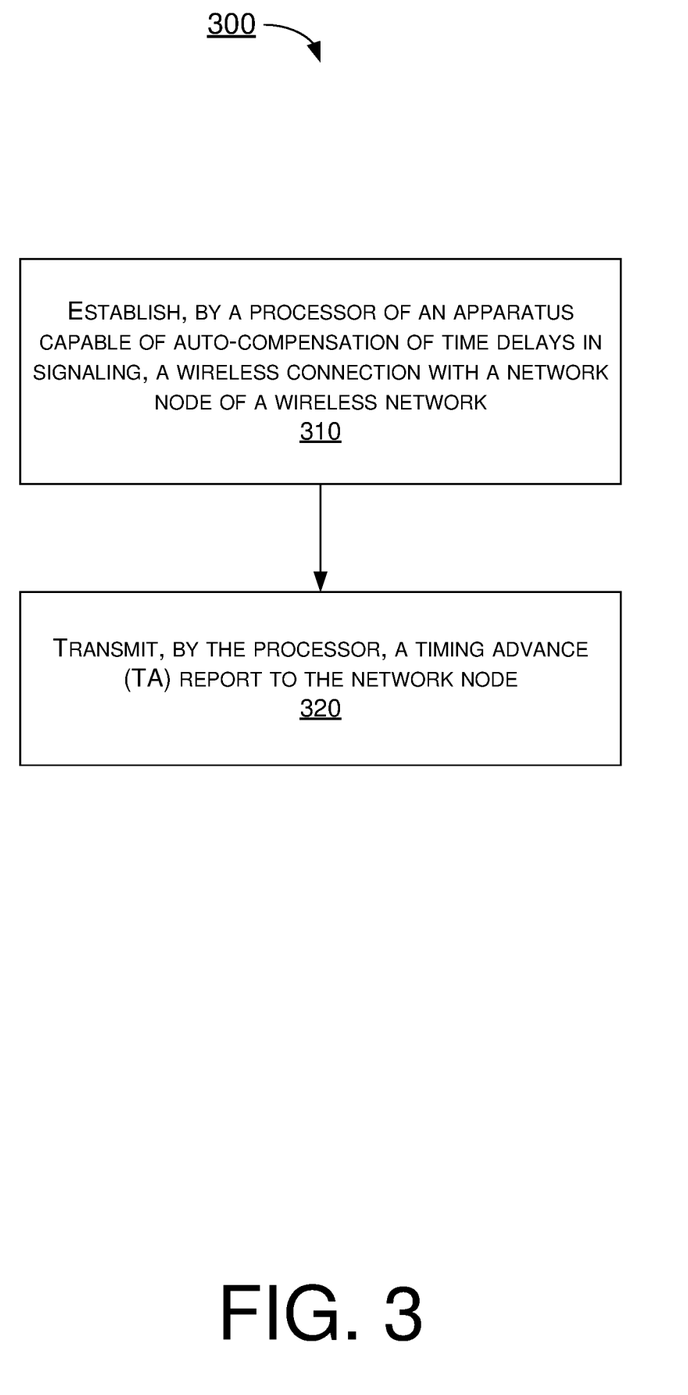
FIG. 3 is a flowchart of an example process in accordance with an implementation of the present disclosure.

FIG. 3 illustrates an example process 300 in accordance with an implementation of the present disclosure. Process 300 may be an example implementation of schemes described above, whether partially or completely, with respect to TA reporting by UE in NTN communications in accordance with the present disclosure. Process 300 may represent an aspect of implementation of features of communication apparatus 210. Process 300 may include one or more operations, actions, or functions as illustrated by one or more of blocks 310 and 320. Although illustrated as discrete blocks, various blocks of process 300 may be divided into additional blocks, combined into fewer blocks, or eliminated, depending on the desired implementation. Moreover, the blocks of process 300 may executed in the order shown in FIG. 3 or, alternatively, in a different order. Process 300 may be implemented by communication apparatus 210 or any suitable UE or machine type devices. Solely for illustrative purposes and without limitation, process 300 is described below in the context of communication apparatus 210 and network apparatus 220. Process 300 may begin at block 310.

At 310, process 300 may involve processor 212 of apparatus 210 (which is capable of auto-compensation of time delays in signaling) establishing, via transceiver 216, a wireless connection with network apparatus 220 as a network node (e.g., base station 125) of a wireless network (e.g., network 120). Process 300 may proceed from 310 to 320.

At 320, process 300 may involve processor 212 transmitting, via transceiver 216, a TA report to network apparatus 220.

In some implementations, in transmitting the TA report, process 300 may involve processor 212 transmitting the TA report in an MAC CE.

In some implementations, in transmitting the TA report, process 300 may involve processor 212 transmitting the TA report in UL control information.

In some implementations, in transmitting the TA report, process 300 may involve processor 212 transmitting the TA report via higher-layer signaling (e.g., RRC signaling).

In some implementations, in transmitting the TA report, process 300 may involve processor 212 transmitting the TA report in a RACH procedure. In some implementations, in transmitting the TA report in the RACH procedure, process 300 may involve processor 212 transmitting the TA report in a message 3 (Msg3), message 5 (Msg5) or message A (MsgA) in a 2-step or 4-step RACH procedure.

In some implementations, in transmitting the TA report, process 300 may involve processor 212 transmitting the TA report responsive to determining that network apparatus 220 is a satellite of an NTN.

In some implementations, in transmitting the TA report, process 300 may involve processor 212 transmitting the TA report periodically.

In some implementations, in transmitting the TA report, process 300 may involve processor 212 transmitting the TA report responsive to receiving a trigger from network apparatus 220.

In some implementations, in transmitting the TA report, process 300 may involve processor 212 transmitting the TA report responsive to a TA value deviating from a threshold by at least a predefined amount.

In some implementations, in transmitting the TA report, process 300 may involve processor 212 transmitting the TA report responsive to expiry of a timer.

In some implementations, process 300 may involve processor 212 performing additional operations. For instance, process 300 may involve processor 212 receiving, via transceiver 216, from network apparatus 220 an apparatus-specific configuration of an offset value ($K_{offset}$). Moreover, process 300 may involve processor 212 performing, via transceiver 216, UL scheduling or UL transmission with the offset value applied.

In some implementations, the offset value may be initially based on a maximum RTT over a beam. In such cases, network apparatus 220 may apply the apparatus-specific configuration of the offset value based on the received TA report.

Figure 4:
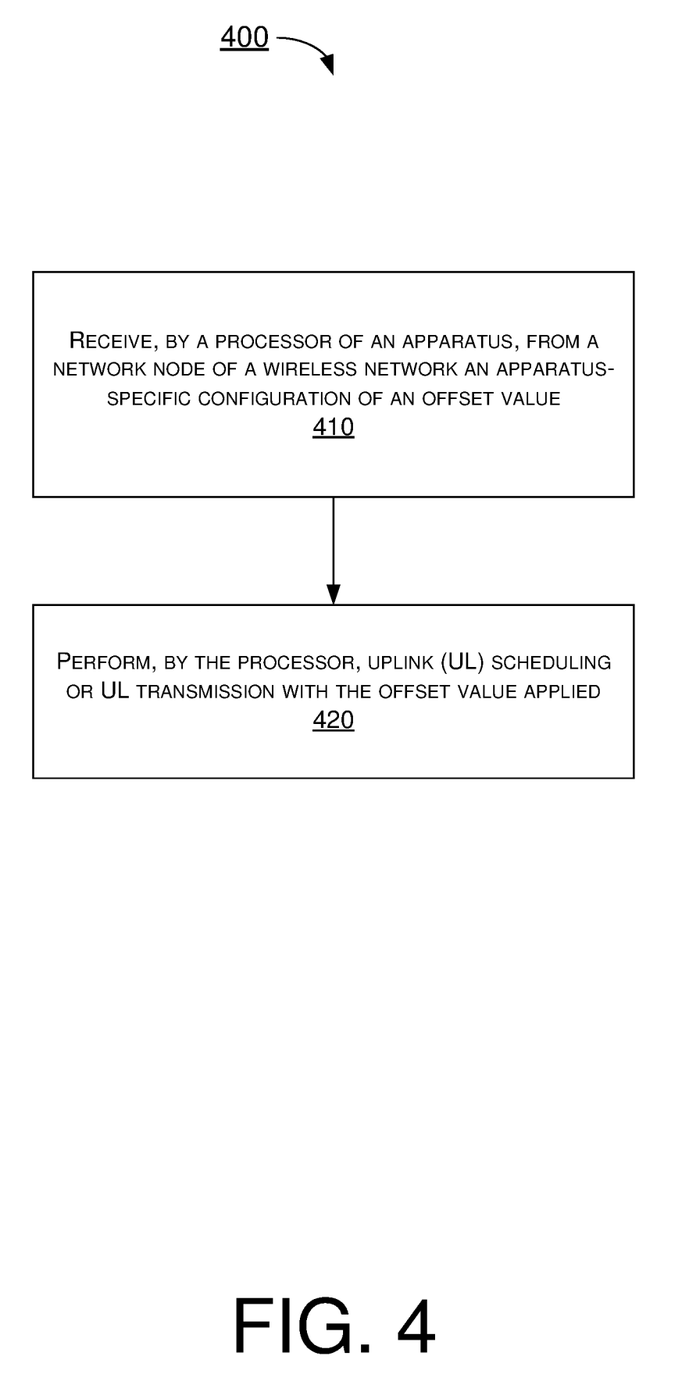
FIG. 4 is a flowchart of an example process in accordance with an implementation of the present disclosure.

FIG. 4 illustrates an example process 400 in accordance with an implementation of the present disclosure. Process 400 may be an example implementation of schemes described above, whether partially or completely, with respect to TA reporting by UE in NTN communications in accordance with the present disclosure. Process 400 may represent an aspect of implementation of features of communication apparatus 210. Process 400 may include one or more operations, actions, or functions as illustrated by one or more of blocks 410 and 420. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may be implemented by communication apparatus 210 or any suitable UE or machine type devices. Solely for illustrative purposes and without limitation, process 400 is described below in the context of communication apparatus 210 and network apparatus 220. Process 400 may begin at block 410.

At 410, process 400 may involve processor 212 of apparatus 210 (which is capable of auto-compensation of time delays in signaling) receiving, via transceiver 216, from network apparatus 220 as a network node (e.g., base station 125) of a wireless network (e.g., network 120) an apparatus-specific configuration of an offset value. Process 400 may proceed from 410 to 420.

At 420, process 400 may involve processor 212 performing, via transceiver 216, UL scheduling or UL transmission with the offset value applied.

In some implementations, the offset value may be initially based on a maximum RTT over a beam. Moreover, apparatus 220, as the network node, may apply the apparatus-specific configuration of the offset value based on a TA value indicated in a TA report after apparatus 220 receives the TA report from apparatus 210.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    establishing, by a processor of an apparatus implemented in a user equipment (UE) that performs auto-compensation of time delays during transmission, a wireless connection with a network node of a wireless non-terrestrial network (NTN); and
    transmitting, by the processor, an explicit timing advance (TA) report of the TA applied by the UE to the network node,
    wherein auto-compensation comprises periodic adjustment to the TA offset between a physical downlink shared channel (PDSCH) or physical downlink control channel (PDCCH) downlink (DL) timing and a corresponding uplink (UL) feedback timing,
    wherein the transmitting of the TA report comprises transmitting the TA report in a medium access control (MAC) control element (CE), and
    wherein the TA report is transmitted as part of a random access channel (RACH) procedure used by the network node to configure a UE-specific scheduling offset between the DL and UL signal.

2. The method of claim 1, wherein the transmitting of the TA report comprises transmitting the TA report responsive to receiving a trigger from the network node.

3. The method of claim 1, wherein the transmitting of the TA report comprises transmitting the TA report responsive to a TA value deviating from a threshold by at least a predefined amount.

4. The method of claim 1, wherein the transmitting of the TA report comprises transmitting the TA report responsive to expiry of a timer.

5. A method, comprising:
    transmitting, by a processor of an apparatus, an uplink (UL) timing advance (TA) report to a network node of a wireless non-terrestrial network (NTN), wherein the UL TA report comprises an initial apparatus-specific offset value based on a maximum roundtrip time (RTT) over a beam subsequently extended by UL TA report updates;
    receiving, by the processor, from the NTN an offset value which is specific to the apparatus and configured by the NTN based on a TA value indicated in the UL TA report, wherein the UL TA report comprises adjustments to a timing offset between a physical downlink shared channel (PDSCH) slot or physical downlink control channel (PDCCH) and a corresponding UL feedback slot; and
    performing, by the processor, UL scheduling or UL transmission with the offset value applied.

6. An apparatus implemented in a user equipment (UE), comprising:
    a transceiver; and
    a processor coupled to the transceiver and configured to perform operations comprising:

establishing, via the transceiver, a wireless connection with a network node of a wireless non-terrestrial network (NTN); and transmitting, via the transceiver, an explicit timing advance (TA) report of the TA applied by the UE to the network node, wherein the processor is configured to perform auto-compensation of time delays during transmission, wherein auto-compensation comprises periodic adjustment to the TA offset between a physical downlink shared channel (PDSCH) or physical downlink control channel (PDCCH) downlink (DL) timing and a corresponding uplink (UL) feedback timing, wherein the transmitting of the TA report comprises transmitting the TA report in a medium access control (MAC) control element (CE), and wherein the TA report is transmitted as part of a random access channel (RACH) procedure used by the network node to configure a UE-specific scheduling offset between the DL and UL signal.

7. The apparatus of claim 6, wherein, in transmitting the TA report, the processor is configured to perform any of:

transmitting the TA report responsive to receiving a trigger from the network node;

transmitting the TA report responsive to a TA value deviating from a threshold by at least a predefined amount; or transmitting the TA report responsive to expiry of a timer.

8. An apparatus, comprising:

a transceiver; and a processor coupled to the transceiver and configured to perform operations comprising:

transmitting, via the transceiver, an uplink (UL) timing advance (TA) report to a network node of a wireless non-terrestrial network (NTN), wherein the UL TA report comprises an initial apparatus-specific offset value based on a maximum roundtrip time (RTT) over a beam subsequently extended by UL TA report updates;

receiving, via the transceiver, from the NTN an offset value which is specific to the apparatus and configured by the NTN based on a TA value indicated in the UL TA report, wherein the UL TA report comprises adjustments to a timing offset between a physical downlink shared channel (PDSCH) slot or physical downlink control channel (PDCCH) and a corresponding UL feedback slot; and performing, via the transceiver, UL scheduling or UL transmission with the offset value applied.

* * * * *